US012789685B2

(12) United States Patent
Okada

(10) Patent No.: US 12,789,685 B2
(45) Date of Patent: Nov. 10, 2026

(54) CABLE RETAINING APPARATUS AND SEAT CABLE MODULE

(71) Applicant: HI-LEX CORPORATION, Takarazuka (JP)

(72) Inventor: Tomoyoshi Okada, Takarazuka (JP)

(73) Assignee: HI-LEX CORPORATION, Takarazuka (JP)

( * ) Notice: Subject to any disclaimer, the term of this patent is extended or adjusted under 35 U.S.C. 154(b) by 335 days.

(21) Appl. No.: 18/576,515

(22) PCT Filed: Mar. 31, 2022

(86) PCT No.: PCT/JP2022/016429
§ 371 (c)(1),
(2) Date: Jan. 4, 2024

(87) PCT Pub. No.: WO2023/002722
PCT Pub. Date: Jan. 26, 2023

(65) Prior Publication Data
US 2024/0326671 A1 Oct. 3, 2024

(30) Foreign Application Priority Data
Jul. 21, 2021 (JP) ................................ 2021-120407

(51) Int. Cl.
*B60N 2/90* (2018.01)
*B60N 2/427* (2006.01)
(Continued)

(52) U.S. Cl.
CPC ............. *B60N 2/90* (2018.02); *B60N 2/6671* (2015.04); *F16B 2/22* (2013.01); *B60N 2/427* (2013.01); *B60N 2002/971* (2018.02)

(58) Field of Classification Search
CPC ......... F16C 1/106; F16L 3/2235; F16L 3/237; F16L 3/223; B60R 16/0215; B60N 2/90;
(Continued)

(56) References Cited

U.S. PATENT DOCUMENTS 1,805,742 A * 5/1931 Reynolds ............... A47H 1/142
248/300
2,166,916 A * 7/1939 Lombard .............. F16B 5/0685
248/222.12
(Continued)

FOREIGN PATENT DOCUMENTS

JP 2016061353 A 4/2016
JP 2018161916 A 10/2018
(Continued)

OTHER PUBLICATIONS

PCT International Search Report for International Application No. PCT/JP2022/016429, mailed Jun. 14, 2022, 5pp.
(Continued)

*Primary Examiner* — Taylor Morris
(74) *Attorney, Agent, or Firm* — The Roy Gross Law Firm, LLC; Roy D. Gross

(57) ABSTRACT

A cable holding device includes: a body portion that is disposed between a pair of side frames; a first holding portion that is provided in the body portion and holds a first seat frame; a second holding portion that is provided in the body portion and holds a second seat frame, and the second holding portion has a structure including a space in which the second seat frame moves relatively to the second holding portion while being held by the second holding portion when an external force acts on the body portion. Using such a structure can reduce the possibility of damage to a cable holding device due to an external force.

11 Claims, 5 Drawing Sheets

1

(51) Int. Cl.
*B60N 2/66* (2006.01)
*F16B 2/22* (2006.01)

(58) Field of Classification Search
CPC ............ B60N 2/6671; B60N 2002/971; B60N 2/427; B60N 2/42709; F16B 2/22
USPC .......................................................... 248/74.2
See application file for complete search history.

(56) References Cited

U.S. PATENT DOCUMENTS 2,657,442 A * 11/1953 Bedford, Jr. .............. F16L 3/13 248/74.2
2,712,917 A * 7/1955 Flora ..................... F16B 5/0685 248/300
3,992,853 A * 11/1976 Morris ...................... F16B 2/22 24/698.2
4,566,660 A * 1/1986 Anscher .................... F16L 3/13 24/453
4,763,541 A * 8/1988 Spease .................... F16C 1/105 74/502.6
4,881,292 A * 11/1989 Hoferer .................. F02M 35/04 24/713.6
5,272,934 A * 12/1993 Chegash ................. F16C 1/106 24/339
5,739,470 A * 4/1998 Takeda ................. H02G 3/0487 174/101
5,762,397 A * 6/1998 Venuto ..................... B60N 2/72 297/452.52
6,216,987 B1 * 4/2001 Fukuo ..................... F16L 3/227 248/316.1
6,234,835 B1 * 5/2001 Bakker .................. H01R 13/73 439/92
6,259,167 B1 * 7/2001 Norton .............. B60R 21/01516 340/667
7,250,573 B2 * 7/2007 Shimadu ............. B60R 16/0215 16/2.2
7,805,815 B2 * 10/2010 Babian ................ B60R 13/0206 24/297
8,814,213 B2 * 8/2014 Aosima .................. B62D 25/18 248/231.71
9,270,100 B2 * 2/2016 Kuhm ..................... F16L 3/085
10,208,874 B2 * 2/2019 Geiger .................... H02S 30/00
10,280,954 B2 * 5/2019 Okamoto ................. B60N 2/72
10,847,960 B1 * 11/2020 Naugler ................... H02G 3/32
10,920,808 B2 * 2/2021 Aoyama ................... F16B 2/10
11,440,492 B2 * 9/2022 Golen .................. B60N 2/0032
11,634,093 B2 * 4/2023 Golen .................. B60N 2/5621 297/180.12
2002/0005464 A1 * 1/2002 Miura ................... F16B 21/075 248/231.9
2004/0262962 A1 * 12/2004 Young .................. B60N 2/0031 297/217.3
2005/0164541 A1 * 7/2005 Joy ........................ F16M 13/00 439/352
2007/0215758 A1 * 9/2007 Ibaraki .................. F16L 3/1075 248/74.1
2010/0116524 A1 * 5/2010 Mizutani ............. B60R 16/0215 174/135
2012/0097806 A1 * 4/2012 Matsushima ....... B60R 16/0215 248/65
2015/0232009 A1 * 8/2015 Jamieson ............. B60N 2/0032 297/452.18
2018/0251004 A1 * 9/2018 Fukuda ................ B60H 1/0055
2019/0024700 A1 * 1/2019 Yoshida .................. F16C 1/101
2021/0114526 A1 4/2021 Elsarelli
2023/0378666 A1 * 11/2023 Walkowski ......... B60R 16/0215
2025/0091497 A1 * 3/2025 Okada ...................... B60N 2/20
2026/0021758 A1 * 1/2026 Okada ...................... B60N 2/90

FOREIGN PATENT DOCUMENTS

JP 2020060203 A 4/2020
JP 2020168986 A 10/2020
WO WO-2025182472 A1 * 5/2025 ............... B60N 2/02

OTHER PUBLICATIONS

PCT Written Opinion for International Application No. PCT/JP2022/016429, mailed Jun. 14, 2022, 3pp.

* cited by examiner

CABLE RETAINING APPARATUS AND SEAT CABLE MODULE

CROSS REFERENCE TO RELATED APPLICATIONS

This application is a National Phase of PCT Patent Application No. PCT/JP2022/016429 having International filing date of Mar. 31, 2022, which claims the benefit of priority of Japanese Patent Application No. 2021-120407, filed Jul. 21, 2021, the contents of which are all incorporated herein by reference in their entirety.

TECHNICAL FIELD

The present invention relates to a cable holding device and a seat cable module.

BACKGROUND ART

A vehicle seat is conventionally provided with a coupling device that couples a plurality of seat cables (e.g., see Patent Literature (hereinafter, referred to as PTL) 1). Such a coupling device and a plurality of seat cables are generally attached to a seat frame or the like of a seat cushion (seat constituent member) with a binding band.

CITATION LIST

Patent Literature

PTL 1
Japanese Patent Application Laid-Open No. 2020-60203

SUMMARY OF INVENTION

Technical Problem

Incidentally, a large number of man-hours is required for attachment work when the coupling device and the seat cables are attached to the seat frame as described above. Thus, in order to enhance the efficiency of the attachment work of the coupling device and the like, a seat cable module (cable holding device) in which the coupling device and the like are modularized and configured to be attachable to the seat frame has been studied.

However, there is possibly a case where an unexpected external force acts on the seat constituent member including the seat cable module; therefore, a configuration capable of reducing the possibility of damage to the seat cable module due to the external force is desired.

An object of the present invention is to provide a cable holding device and a seat cable module each capable of reducing the possibility of damage to a cable holding device due to an external force.

Solution to Problem

A cable holding device according to the present invention is a cable holding device that is attached to a first seat frame bridging a pair of side frames of a seat constituent member in a vehicle seat and a second seat frame bridging the pair of side frames at a different position from the first seat frame and that holds a seat cable of the vehicle seat, the cable holding device including:

a body portion that is disposed between the pair of side frames;

a first holding portion that is provided in the body portion and holds the first seat frame; and a second holding portion that is provided in the body portion and holds the second seat frame, in which the second holding portion includes a space in which the second seat frame moves relatively to the second holding portion while being held by the second holding portion when an external force acts on the body portion.

A seat cable module to the present invention includes:

a seat cable of a vehicle seat; and the above-described cable holding device.

Advantageous Effects of Invention

According to the present invention, it is possible to reduce the possibility of damage to a cable holding device due to an external force.

DESCRIPTION OF EMBODIMENTS

Figure 1:
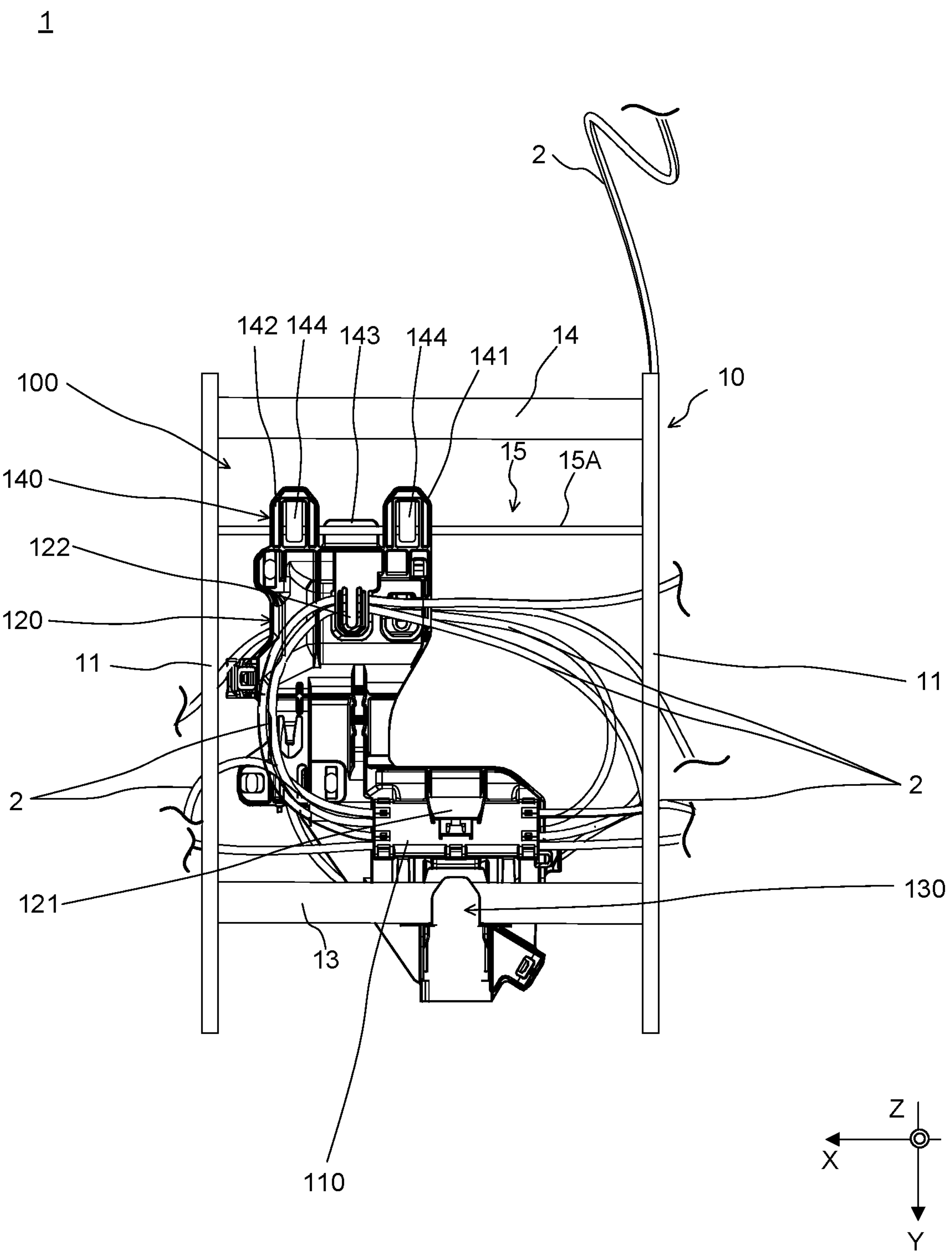
FIG. 1 is a diagram of a vehicle seat to which a seat cable module according to an embodiment of the present invention is applied as viewed from a Z direction.

Hereinafter, an embodiment of the present invention will be described in detail with reference to the drawings. FIG. 1 is a diagram of vehicle seat 1 to which seat cable module 100 according to an embodiment of the present invention is applied as viewed from a Z direction.

As illustrated in FIG. 1, seat cable module 100 according to the present embodiment is applied to, for example, vehicle seat 1 provided in a vehicle.

Further, in the following description, an orthogonal coordinate system (X, Y, Z) is used. The orthogonal coordinate system (X, Y, Z) is commonly used in the drawings to be described later. The orthogonal coordinate system is configured so that the X axis is a left-right direction of the vehicle including vehicle seat 1, the Y axis is a front-rear direction of the vehicle, and the Z axis is an up-down direction of the vehicle.

[Vehicle Seat]

Vehicle seat 1 includes a seat back (not illustrated) serving as a backrest portion for an occupant, a seat cushion (not illustrated) serving as a seating portion for the occupant, and seat cable module 100 described above. Vehicle seat 1 is provided with, for example, a reclining device (not illustrated). Thus, an operation force acting when the occupant operates an operation lever (not illustrated) of a reclining device is transmitted to a release lever for unlocking the seat back through seat cable 2, and then the seat back is unlocked and is in a reclining state.

[Seat Cushion]

The seat cushion (not illustrated) includes seat frame 10 constituting a framework of the seating portion in vehicle seat 1. Seat frame 10 has a substantially rectangular frame shape, and includes a pair of side frames 11, front pipe 13, rear pipe 14, and load receiving member 15.

The pair of side frames 11 is disposed to face each other in the X direction, and constitutes a part of an outer frame of seat frame 10.

Front pipe 13 is a part that bridges the pair of side frames 11, and is disposed in an area on the positive side of side frames 11 in the Y direction from the central portion of side frames 11 in the Y direction.

Rear pipe 14 connects the end portions of the pair of side frames 11 on the negative side in the Y direction, and constitutes a part of the outer frame of seat frame 10.

Load receiving member 15 is a part that receives a load when an occupant sits on the seat cushion, and is formed of a flexibly deformable wire or the like. Load receiving member 15 includes bridging part 15A that bridges the pair of side frames 11.

Bridging part 15A is attached to an area positioned on the negative side of side frames 11 in the Y direction from the central portion of side frames 11 in the Y direction. Thus, load receiving member 15 is provided between the pair of side frames 11 so as to receive a load when the occupant sits on vehicle seat 1.

[Seat Cable Module]

Seat cable module 100 is configured so that seat cable 2 of vehicle seat 1 and a member coupling seat cables 2 is attachable to the seat constituent member. In the present embodiment, seat cable module 100 is provided to the seat cushion. The seat cushion (seat frame 10) is an example of the "seat constituent member" of the present invention.

Figure 2:
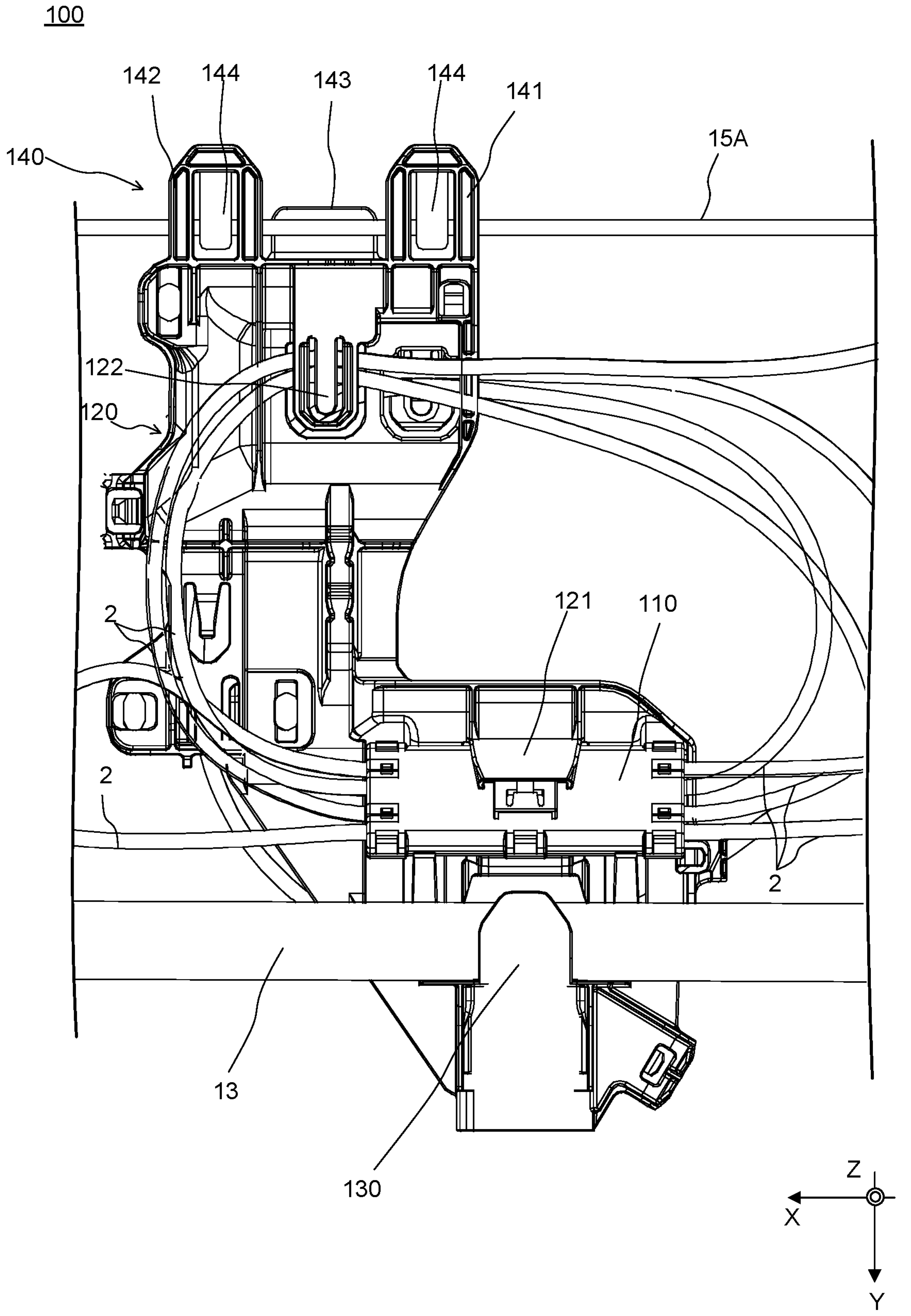
FIG. 2 is an enlarged view of the seat cable module part of the vehicle seat in FIG. 1.

As illustrated in FIGS. 1 and 2, seat cable module 100 is disposed between the pair of side frames 11 and is attached to seat frame 10. Seat cable module 100 includes, in addition to seat cable 2 described above, coupling portion 110, body portion 120, first holding portion 130, and second holding portion 140. Coupling portion 110, body portion 120, first holding portion 130, and second holding portion 140 are included in the "cable holding device" of the present invention.

Seat cable 2 is a control cable for operating a reclining device of vehicle seat 1 and for operating a lock mechanism for fixing a position of a seat surface of vehicle seat 1. In the present embodiment, the first seat cable connected to the above-described operation lever and the second seat cable connected to the above-described release lever are provided as sheet cables 2. Seat cables 2 each include an inner cable and an outer casing into which the inner cable is inserted.

[Coupling Portion]

Coupling portion 110, which is a cable joint lying between the first seat cable and the second seat cable to couple the first seat cable and the second seat cable together, is attached to body portion 120.

Coupling portion 110 includes, for example, a joint case and a joint piece housed inside the joint case. The joint piece is apart that couples the respective end portions of the inner cables of seat cables 2 together.

Coupling portion 110 is provided as described above, so that, when the occupant operates an operation lever, an operation force inputted to the first seat cable is transmitted to the second seat cable through coupling portion 110, and the release lever is driven.

[Body Portion]

Body portion 120 is a resin member (e.g., polypropylene) formed in a plate shape, and is disposed at a position corresponding to a position between front pipe 13 and bridging part 15A of load receiving member 15. Body portion 120 has a length, in the Y direction, corresponding to a distance of the Y direction between front pipe 13 and bridging part 15A. Body portion 120 includes attaching portion 121 and engaging portion 122. Note that body portion 120 may have a length equal to or longer than the length corresponding to the above-described distance in the Y direction.

Attaching portion 121 is a part to which coupling portion 110 is attached, and is placed in an area of body portion 120 on the negative side in the Y direction from front pipe 13 when seat cable module 100 is attached to seat frame 10.

Engaging portion 122 is placed, of both end portions (first end portion and second end portion) of body portion 120 on the positive and negative sides in the Y direction, in an area on the end portion side on the negative side, and positioned on the negative side in the Y direction from attaching portion 121. Engaging portion 122 is configured to protrude from body portion 120 toward the positive side in the Z direction and extend toward the positive side in the Y direction.

Thus, in engaging portion 122, a part of seat cable 2 can be placed in a space protruding from body portion 120 and can be engaged with engaging portion 122.

Further, first holding portion 130 is provided at an end portion of body portion 120 on the positive side in the Y direction, and second holding portion 140 is provided at an end portion of body portion 120 on the negative side in the Y direction.

[First Holding Portion]

Figure 3:
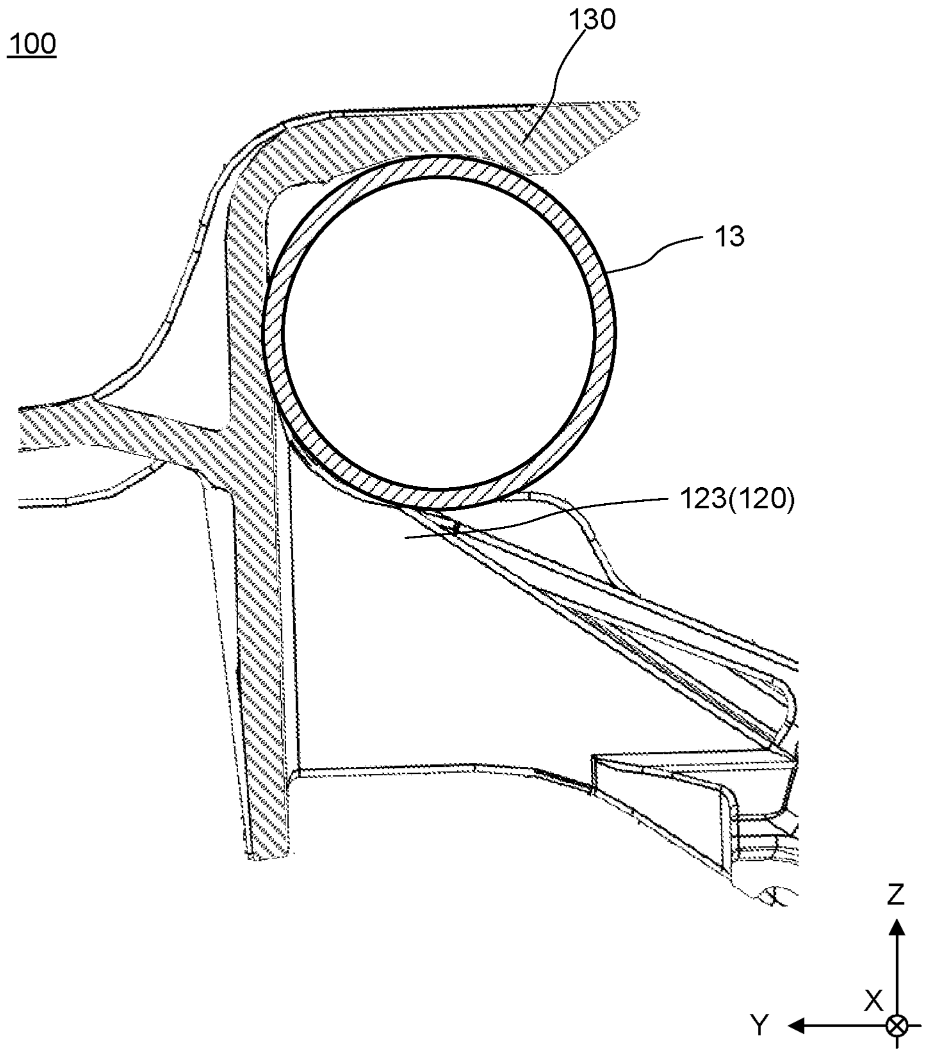
FIG. 3 is a cross-sectional view of the first holding portion part.

As illustrated in FIG. 3, first holding portion 130 is configured to be capable of holding front pipe 13. Front pipe 13 corresponds to the "first seat frame" of the present invention.

Specifically, first holding portion 130 is configured to protrude from body portion 120 toward the positive side in the Z direction and extend toward the negative side in the Y direction, and is placed so as to be in contact with a part of front pipe 13 on the positive side in the Y direction and a part of front pipe 13 on the positive side in the Z direction. A surface of first holding portion 130 being in contact with front pipe 13 on the positive side in the Z direction has a shape along a circumferential surface of front pipe 13.

Further, body portion 120 is disposed so as to face a part of front pipe 13 on the negative side in the Z direction. Part 123 of body portion 120 facing front pipe 13 has a shape along the circumferential surface of front pipe 13.

Thus, first holding portion 130 is attached to front pipe 13 so that body portion 120 is rotatable with first holding portion 130 as a fulcrum.

[Second Holding Portion]

As illustrated in FIG. 2, second holding portion 140 is configured to be capable of holding bridging part 15A of load receiving member 15, and includes first wall portion 141, second wall portion 142, third wall portion 143, and elastic portion 144. Bridging part 15A corresponds to the "second seat frame" of the present invention.

Figure 4A:
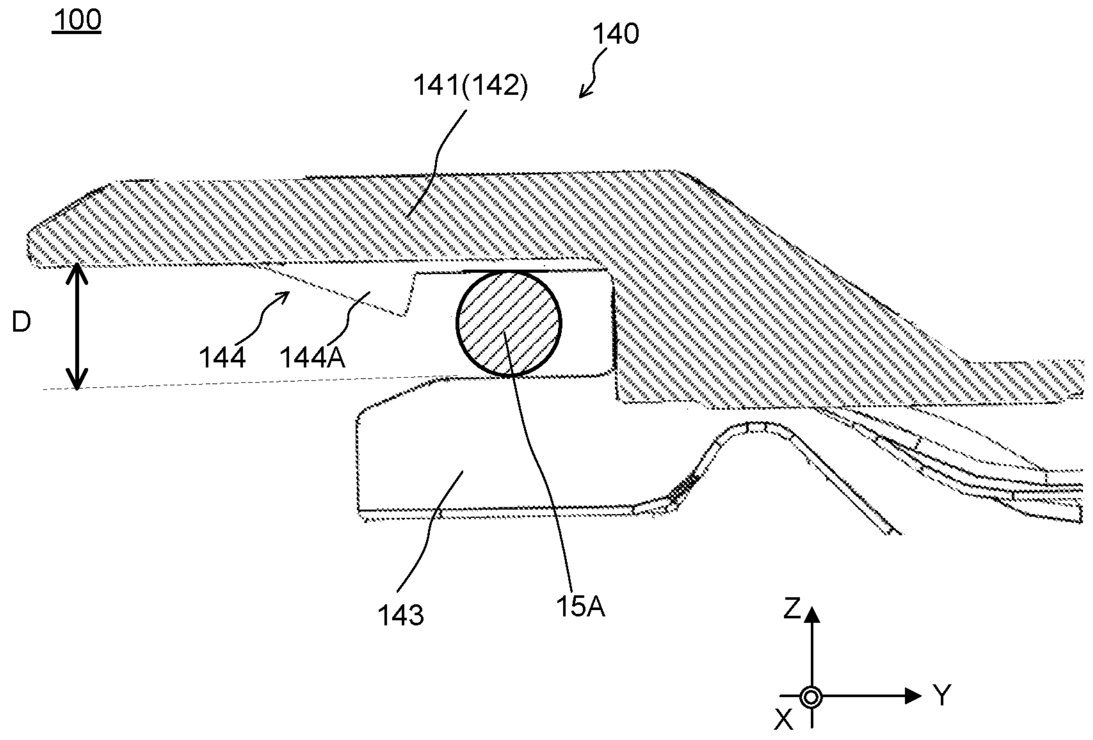
FIG. 4A is a cross-sectional view of the first wall portion or the second wall portion in the second holding portion.

First wall portion 141 and second wall portion 142 are portions positioned on the positive side in the Z direction from bridging part 15A (see also FIG. 4A). First wall portion 141 and second wall portion 142 are each provided so as to protrude from an end portion of body portion 120 on the negative side in the Y direction toward the negative side in the Y direction, and formed in a U shape that opens to the positive side in the Y direction.

First wall portion 141 is provided on the negative side in the X direction in the end portion of body portion 120 on the negative side in the Y direction. Second wall portion 142 is provided on the positive side in the X direction in the end portion of body portion 120 on the negative side in the Y direction. First wall portion 141 and second wall portion 142 have substantially the same shape.

Third wall portion 143 is a portion positioned on the negative side in the Z direction from bridging part 15A (see also FIG. 4A), and is provided so as to protrude from an end portion of body portion 120 on the negative side in the Y direction toward the negative side in the Y direction. Third wall portion 143 is provided at a central part in the X direction in the end portion of body portion 120 on the negative side in the Y direction. In other words, first wall portion 141 and second wall portion 142 are placed at positions interposing third wall portion 143 in between in the X direction (the first direction) in which bridging part 15A extends.

Then, as illustrated in FIG. 4A, distance D between first wall portion 141 and second wall portion 142 on one hand and third wall portion 143 on the other in the Z direction is longer than the length of bridging part 15A in the Z direction. Thus, when second holding portion 140 is disposed so that first wall portion 141 and second wall portion 142 on one hand and third wall portion 143 on the other interpose bridging part 15A in between in the Z direction, a space in which bridging part 15A moves relatively to second holding portion 140 in the Z direction is formed between first holding portion 141 and second wall portion 142 on one hand and bridging part 15A on the other.

Figure 4B:
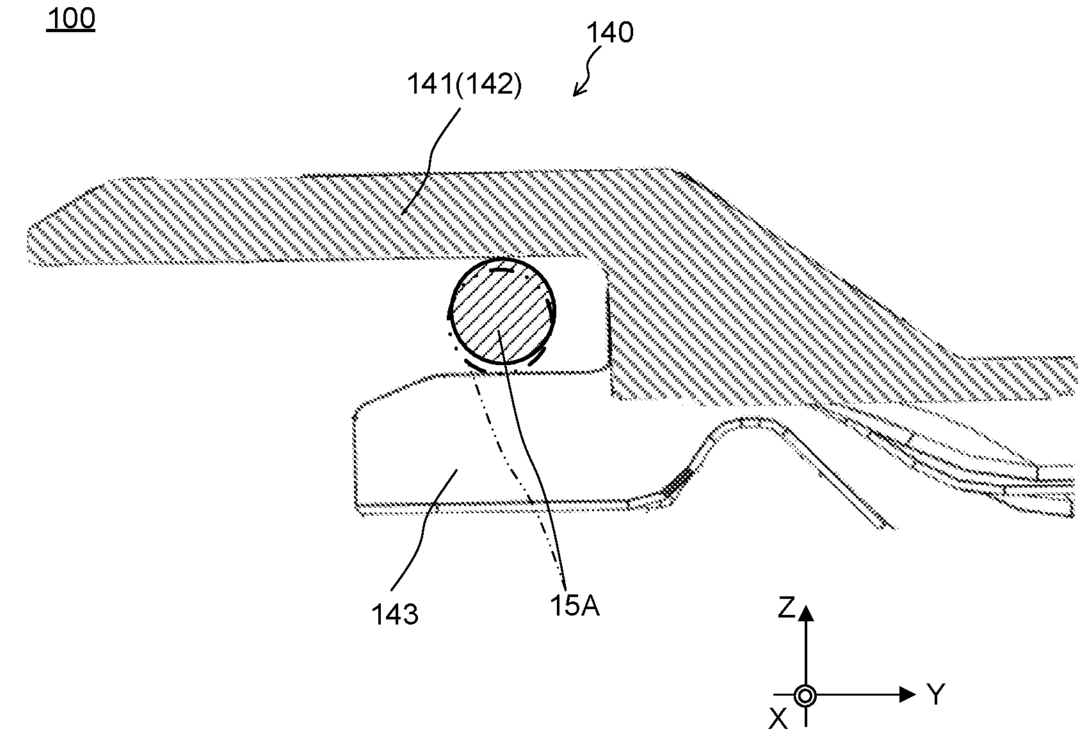
FIG. 4B is a cross-sectional view of the first wall portion or the second wall portion in the second holding portion when an external force is applied.

For example, as illustrated in FIG. 4B, when an external force toward the Z direction acts on seat cable module 100, bridging part 15A can move in the Z direction between first wall portion 141 and second wall portion 142 on one hand and third wall portion 143 on the other.

Figure 5A:
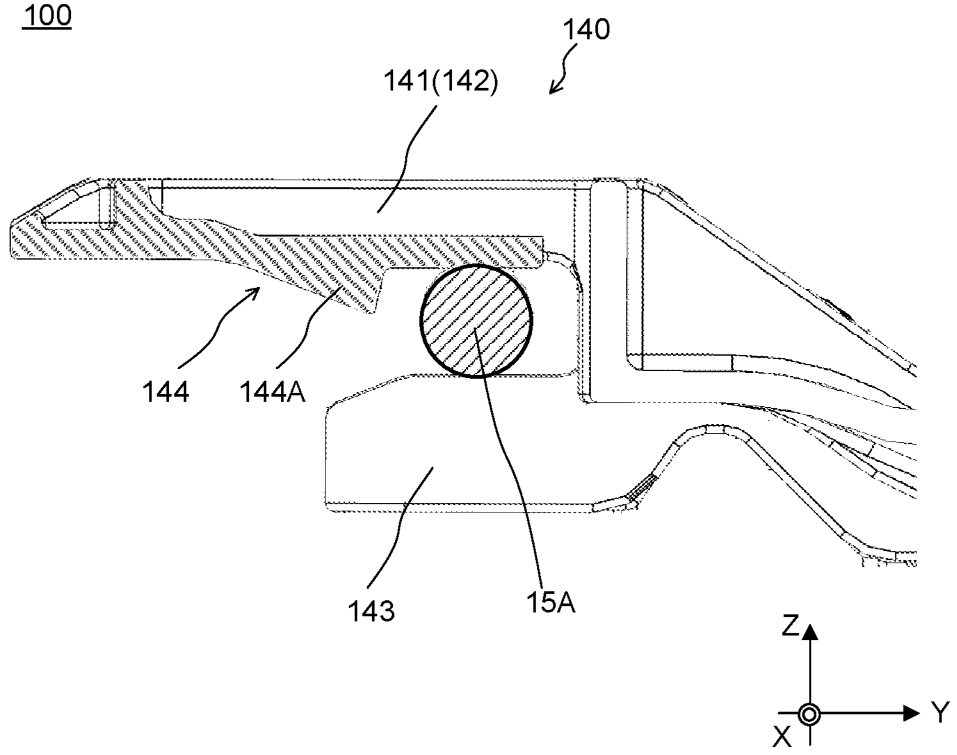
FIG. 5A is a cross-sectional view of an elastic portion in the second holding portion.

As illustrated in FIG. 2, elastic portion 144 is a pawl portion that is elastically deformable and extends from each of the end portions of first wall portion 141 and second wall portion 142 on the negative side in the Y direction toward the positive side in the Y direction. In other word, elastic portions 144 extends from the U-shape bottom portions of first wall portion 141 and second wall portion 142 toward the positive side in the Y direction (the second direction orthogonal to the first direction). As illustrated in FIGS. 4A and 5A, elastic portion 144 is provided so as to be positioned on the negative side in the Z direction from first wall portion 141 and second wall portion 142.

Specifically, elastic portion 144 is placed so as to press bridging part 15A against third wall portion 143 when second holding portion 140 is disposed so as to hold bridging part 15A. That is, elastic portion 144 biases bridging part 15A toward third wall portion 143. Accordingly, third wall portion 143 is placed so as to support bridging part 15A on the side opposite to first wall portion 141 and second wall portion 142 with respect to bridge part 15A.

Thus, first wall portion 141 and second wall portion 142 are placed, having spaces with bridging part 15A, and movement of bridging part 15A is allowable in the spaces.

Figure 5B:
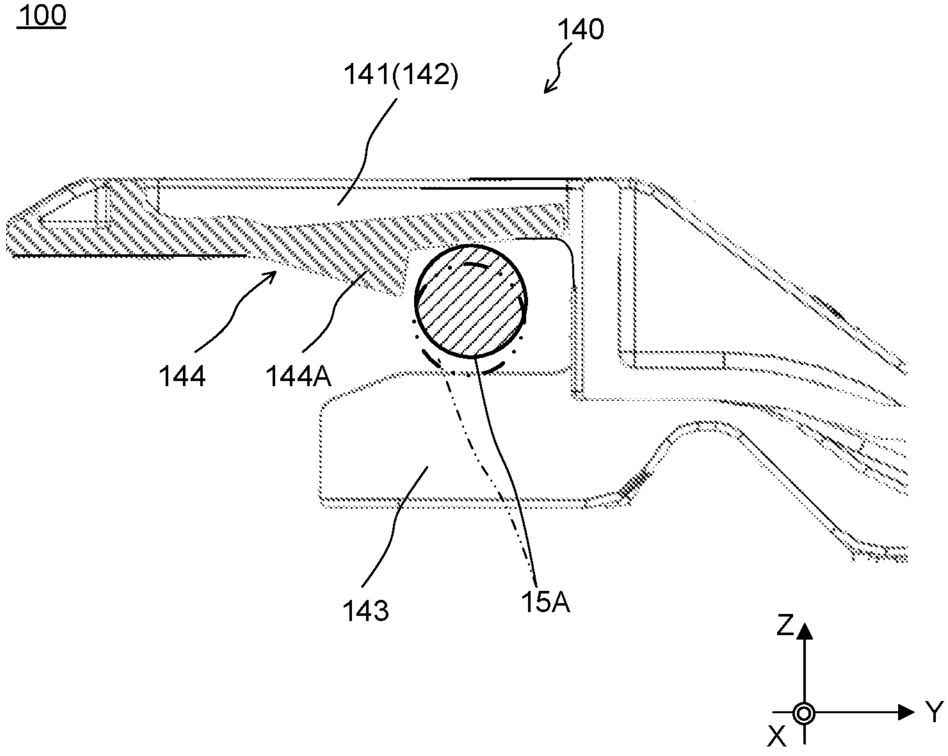
FIG. 5B is a cross-sectional view of the elastic portion in the second holding portion when an external force is applied.

Then, when an external force toward the Z direction acts on seat cable module 100 as described above, elastic portion 144 elastically deforms and presses bridging part 15A against third wall portion 143 with the restoring force as illustrated in FIG. 5B. Therefore, a force to return to the position supported by third wall portion 143 (position illustrated with a two-dot chain line) acts on bridging part 15A, and thus the occurrence of bridging part 15A vibrating in second holding portion 140 can be reduced.

Further, elastic portion 144 includes restricting portion 144A. Restricting portion 144A is provided so as to protrude from a substantially central portion of elastic portion 144 in the Y direction toward the negative side in the Z direction, and positioned on the negative side in the Y direction from bridging part 15A when bridging part 15A is supported by second holding portion 140.

This allows restricting portion 144A to restrict the movement of bridging part 15A relative to elastic portion 144 in the Y direction.

Further, restricting portion 144A includes an inclined surface inclined so as to be positioned on the positive side in the Z direction as the surface goes from the apex part, which is the most protruding part on the negative side in the Z direction, toward the side opposite to a position holding bridging part 15A (negative side in the Y direction).

With this inclined surface, bridging part 15A can easily override the apex portion by sliding the inclined surface when bridging part 15A is to be held by second holding portion 140. Consequently, bridging part 15A can be easily positioned where bridging part 15A is held by second holding part 140.

Further, a predetermined space is given between restricting portion 144A and bridging part 15A in the Y direction. In other words, restricting portion 144A is placed, having a predetermined space with bridging part 15A. That is, a space in which bridging part 15A moves relatively to second holding portion 140 in the Y direction is formed between restricting portion 144A and bridging part 15A.

Accordingly, even when bridging part 15A relatively moves in the Y direction due to action of an external force, the movement is allowed by the predetermined space. That is, when an external force acts on seat cable module 100 in the Y direction, bridging part 15A can move in the Y direction.

[Effects of Sheet Cable Module]

The operation and effects of the present embodiment configured as described above will be described. In seat cable module 100, coupling portion 110 to which seat cables 2 has been coupled is attached to body portion 120, and first holding portion 130 holds front pipe 13. Then, body portion 120 is rotated with first holding portion 130 as a fulcrum, and second holding portion 140 then holds bridging part 15A. Accordingly, seat cable module 100 is attached to seat frame 10.

As described above, seat cable 2 and coupling portion 110 can be integrated and easily attached to seat frame 10 in seat cable module 100. This can enhance the efficiency of the attachment work, compared with a configuration in which the seat cable and the coupling portion are each attached to the seat frame.

Incidentally, on a seat constituent member such as a seat cushion, an external force greater than an external force acting when the occupant sits on vehicle seat 1, that is, an unexpected external force exceeding a normal range of use possibly acts. The examples includes a force caused by the occupant locally pressing the seat cushion with the knee or the like.

Such a case causes a situation in which the relatively positional relationship between seat frame 10 and seat cable module 100 is shifted and seat frame 10 moves relatively to seat cable module 100.

For example, in a configuration in which a seat cable module is attached to a seat frame so as not to be movable, when an unexpected external force acts on a seat constituent member, a positional relationship between the seat constituent member and the seat cable module does not change, which possibly causes damage to an attaching portion of the seat cable module.

On the other hand, in the present embodiment, second holding portion 140 includes a space in which bridging part 15A moves relatively to second holding portion 140 while being held by second holding portion 140 when an external force acts on body portion 120 (See FIGS. 4A, 4B, 5A, and 5B).

This allows second holding portion 140 to easily absorb the relative movement of bridging part 15A due to the action of the external force, so that the possibility of damage to seat cable module 100 (cable holding device) due to the external force can be reduced.

Further, second holding portion 140 includes first wall portion 141, second wall portion 142, and third wall portion 143, so that the movement of bridging part 15A can be easily configured to be allowable in second holding portion 140, and the relative movement of bridging part 15A can be absorbed more effectively.

Further, in a case where there are variations of placement positions of bridging part 15A and/or front pipe 13, the attachment position of second holding portion 140 to bridging part 15A can be easily adjusted by the space in second holding portion 140. That is, the variation can be absorbed by the space in second holding portion 140, which can make the attachment of seat cable module 100 easier.

Furthermore, since first wall portion 141 and second wall portion 142 are placed at positions interposing third wall portion 143 in between in the X direction, first wall portion 141 or second wall portion 142 and third wall portion 143 do not interpose bridging part 15A in between in the Z direction at the same position in the X direction.

In a configuration in which the first wall portion or second wall portion and the third wall portion interpose the bridging part in between at the same position in the X direction, when the bridging part vibrates inside the second holding portion, a force received from the bridging part is likely to concentrate at the position.

On the other hand, in the present embodiment, first wall portion 141 or second wall portion 142 and third wall portion 143 do not interpose bridging part 15A in between at the same position in the X direction, so that the position where a force from bridging part 15A acts can be varied in the X direction when bridging part 15A vibrates inside second holding portion 140. Thus, the force from bridging part 15A can be easily dispersed to first wall portion 141, second wall portion 142, and third wall portion 143.

Further, elastic portion 144 biases bridging part 15A toward third wall portion 143, so that the vibration of bridging part 15A occurred in second holding portion 140 when the vehicle vibrates can be reduced (see FIGS. 5A and 5B). This can reduce generation of vibration noises caused by bridging part 15A vibrating in the space in second holding portion 140 and colliding with a wall portion.

Further, since elastic portion 144 is provided to each of first wall portion 141 and second wall portion 142, bridging part 15A can be biased at two positions of first wall portion 141 and second wall portion 142. Thus, the positional relationship between first wall portion 141 and second wall portion 142 on one hand and bridging part 15A on the other can be stabilized.

Further, elastic portion 144 includes restricting portion 144A, which can prevent bridging part 15A from coming off from elastic portion 144 (second holding portion 140) by moving in the Y direction.

Further, first holding portion 130 is attached to front pipe 13 so that body portion 120 is rotatable. Thus, attaching first holding portion 130 to front pipe 13 and then rotating body portion 120 makes it easier to match the position of second holding portion 140 with bridging part 15A, and the attaching operation can be consequently easier.

Further, coupling portion 110 is provided in body portion 120, that is, between first holding portion 130 and second holding portion 140, so that body portion 120 need not be configured to be larger than necessary, which can contribute to miniaturization of seat cable module 100.

Further, engaging portion 122, which is a portion engaging with and holding seat cable 2, is provided in body portion 120, that is, between first holding portion 130 and second holding portion 140, so that interfering of engaging portion 122 with a portion other than front pipe 13 and bridging part 15A can be suppressed.

Further, since engaging portion 122 extends from a position (one side) in body portion 120 closer to the negative side in the Y direction toward the positive side (the other side) in the Y direction, seat cable 2 is likely to stay in body portion 120 even when seat cable 2 comes off from engaging portion 122. Thus, it is possible to suppress positioning of seat cable 2 outside the range of seat cable module 100 (cable holding device).

Note that, in the above embodiment, coupling portion 110 is configured to be attachable to body portion 120, but the present invention is not limited thereto, and the coupling portion may be configured integrally with the body portion.

Further, in the above-described embodiment, the configuration in which coupling portion 110 and engaging portion 122 for holding seat cable 2 is included has been described, but the present invention is not limited thereto, and the coupling portion and the engaging portion need not be provided as long as the seat cable is held by a portion other than the coupling portion and the engaging portion.

Furthermore, in the above-described embodiment, elastic portion 144 is provided in each of first wall portion 141 and second wall portion 142, but the present invention is not limited thereto. For example, the elastic portion may be provided in only one of the first wall portion and the second wall portion, or may be provided in a portion other than the first wall portion and the second wall portion.

In the above-described embodiment, elastic portion 144 is provided in second holding portion 140, but the present invention is not limited thereto, and the elastic portion need not be provided in the second holding portion. However, in terms of suppressing vibration noises of the second seat frame in the second holding portion, it is preferred that the elastic portion be provided in the second holding portion.

Further, in the above-described embodiment, elastic portion 144 includes restricting portion 144A, but the present invention is not limited thereto, and the elastic portion need not include the restricting portion.

Further, in the above-described embodiment, first wall portion 141 and second wall portion 142 are provided at positions interposing third wall portion 143 in between in the X direction, but the present invention is not limited thereto, and the first wall portion and the second wall portion need not be provided at positions interposing the third wall portion in between in the X direction.

Further, in the above-described embodiment, the second holding portion includes the first wall portion, the second wall portion, and the third wall portion, but the present invention is not limited thereto, and the second holding portion may be configured to include either one of the first wall portion or the second wall portion and the third wall portion.

Further, in the above-described embodiment, the first holding portion is provided so that the body portion is rotatable with the first holding portion as a fulcrum, but the present invention is not limited thereto, and the first holding portion need not be provided so that the body portion is rotatable.

Further, in the above-described embodiment, front pipe 13 is exemplified as the first seat frame, but the present invention is not limited thereto, and a seat frame other than the front pipe may be used as the first seat frame.

Further, in the above-described embodiment, bridging part 15A is exemplified as the second seat frame, but the present invention is not limited thereto, and a seat frame other than the bridging part may be used as the second seat frame.

Further, in the above-described embodiment, a seat cushion is exemplified as the seat constituent member, but the present invention is not limited thereto, and a member other than the seat cushion such as a seat back may be used as the seat constituent member.

Further, in the above-described embodiment, vehicle seat 1 is a seat mounted in a vehicle, but the present invention is not limited thereto, and vehicle seat 1 may be a seat mounted in a conveyance other than a vehicle.

The embodiment disclosed herein is merely an exemplification in every respect and should not be considered as limitative. The scope of the present invention is indicated by the claims rather than the above description, and is intended to include all modifications within the scope and equivalent meaning of the claims.

The embodiment of the present invention has been described above. It should be noted that the above description is illustrative of a preferred embodiment of the present invention, and the scope of the present invention is not limited thereto. That is, the configuration of the device and the shape of each part are merely an example, and it is obvious that various modifications and additions to these examples are possible within the scope of the present invention.

INDUSTRIAL APPLICABILITY

A cable holding device according to the present invention is useful as a cable holding device and a seat cable module each capable of reducing the possibility of damage to a cable holding device due to an external force.

REFERENCE SIGNS LIST

1 Vehicle seat
2 Seat cable
10 Seat frame
11 Side frame
13 Front pipe
14 Rear pipe
15 Load receiving member
15A Bridging part
100 Seat cable module
110 Coupling portion
120 Body portion
121 Attaching portion
122 Engaging portion
123 Part
130 First holding portion
140 Second holding portion
141 First wall portion
142 Second wall portion
143 Third wall portion
144 Elastic portion
144A Restricting portion

The invention claimed is:

1. A cable holding device that is attached to a vehicle seat and holds a seat cable of the vehicle seat, the vehicle seat including: a pair of side frames; a first seat frame bridging the pair of side frames; a second seat frame bridging the pair of side frames at a different position from the first seat frame; and the seat cable, the cable holding device comprising:

a body portion that is disposed between the pair of side frames;

a first holding portion that is provided in the body portion and holds the first seat frame; and a second holding portion that is provided in the body portion and holds the second seat frame, wherein the second holding portion includes a space in which the second seat frame moves relatively to the second holding portion while being held by the second holding portion when an external force acts on the body portion, and the space is configured with a distance longer than a length of the second seat frame in a direction of the external force.

2. The cable holding device according to claim 1, wherein the second holding portion includes:

a first wall portion and a second wall portion; and a third wall portion that is provided on an opposite side to the first wall portion and the second wall portion with respect to the second seat frame to support the second seat frame, wherein the distance is a distance between the first wall portion and the second wall portion, and the third wall portion, and allows movement of the second seat frame in the direction of the external force.

3. The cable holding device according to claim 2, wherein the first wall portion and the second wall portion are disposed at positions interposing the third wall portion therebetween in a first direction in which the second seat frame extends and the first direction is different from the direction of the external force.

4. The cable holding device according to claim 2, wherein the second holding portion includes an elastic portion that is provided on an opposite side to the third wall portion with respect to the second seat frame and is elastically deformable to bias the second seat frame toward the third wall portion.

5. The cable holding device according to claim 4, wherein the elastic portion is provided in each of the first wall portion and the second wall portion.

6. The cable holding device according to claim 4, wherein the elastic portion extends in a second direction orthogonal to the first direction in which the second seat frame extends, the second direction that is different from the direction of the external force, and includes a restricting portion restricting movement of the second seat frame relative to the elastic portion toward the second direction.

7. The cable holding device according to claim 4, wherein the elastic portion is positioned on the third wall portion side in the direction of the external force from the first wall portion and the second wall portion.

8. The cable holding device according to claim 1, wherein the first holding portion is attached to the first seat frame so that the body portion is rotatable with the first holding portion as a fulcrum.

9. The cable holding device according to claim 1, wherein the body portion includes a coupling portion that is provided between the first holding portion and the second holding portion and that couples a plurality of seat cables.

10. The cable holding device according claim 1, wherein the body portion includes an engaging portion that is provided between the first holding portion and the second holding portion and that engages with a part of the seat cable.

11. The cable holding device according to claim 10, wherein the engaging portion is disposed on one of a first end portion side on a side of the first holding portion and a second end portion side on a side of the second holding portion in the body portion, and extends toward the other side of the first end portion and the second end portion.

* * * * *